(12) United States Patent
Heller

(10) Patent No.: US 6,202,527 B1
(45) Date of Patent: *Mar. 20, 2001

(54) CUTTING ARRANGEMENT FOR A MATERIAL WEB

(75) Inventor: Martin Heller, Zürich (CH)

(73) Assignee: Gretag Imaging AG, Regendorf (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/248,288

(22) Filed: Feb. 11, 1999

(30) Foreign Application Priority Data

Feb. 11, 1998 (EP) .................................................. 98102363

(51) Int. Cl.[7] ...................................................... B26D 5/08
(52) U.S. Cl. ................................. 83/368; 83/455; 83/614
(58) Field of Search ............................ 83/614, 364, 368, 83/455, 578

(56) References Cited

U.S. PATENT DOCUMENTS

| | | | |
|---|---|---|---|
| 1,434,475 | * 11/1922 | Austin | 83/455 |
| 2,624,408 | * 1/1953 | Stein | 83/455 |
| 3,412,768 | * 11/1968 | Torwegge | 83/364 |
| 3,657,952 | 4/1972 | Brockbank et al. | 83/102 |
| 3,664,223 | * 5/1972 | Brocklehurst | 83/368 |
| 3,763,728 | * 10/1973 | Blackman | 83/364 |
| 4,376,399 | 3/1983 | Victor | 83/13 |
| 4,541,317 | * 9/1985 | Van Humbeeck et al. | 83/364 |
| 4,981,059 | * 1/1991 | Kobayashi | 83/614 |
| 5,074,178 | * 12/1991 | Shetley et al. | 83/364 |
| 5,388,488 | * 2/1995 | Geidl et al. | 83/455 |

FOREIGN PATENT DOCUMENTS 0084347   7/1983   (EP) .

* cited by examiner

Primary Examiner—Kenneth E. Peterson
Assistant Examiner—Stephen Choi
(74) Attorney, Agent, or Firm—Burns, Doane, Swecker & Mathis, L.L.P.

(57) ABSTRACT

A cutting arrangement for a material web, especially photographic copy material in a photographic copier includes a knife roller (5) and a drive (3, 4, 6 to 9) for reciprocating the knife roller (5) between two turnaround positions ($S_1$, $S_4$) transverse to the material web (M) to be cut, to thereby carry out one cut respectively. At least two starting positions ($S_1$, $S_2$ or $S_3$, $S_4$) are provided for each of the two cutting directions which are associated with different widths of the material web (M). The drive (3, 4, 6 to 9) commences the cutting movement of the knife roller (5) respectively at that starting position ($S_1$, $S_2$ or $S_3$, $S_4$) associated for one cutting direction with the respective material web width and moves the knife roller (5) after completion of the cut to the respectively closest turnaround position ($S_1$, $S_4$) and from thereback to the starting position ($S_4$, $S_3$ or $S_2$, $S_1$) associated for the other cutting direction with the respective material web width, provided that the latter starting position ($S_4$, $S_3$ or $S_2$, $S_1$) does not coincide with a turnaround position ($S_1$, $S_4$). The arrangement of different starting positions for material webs of different width makes time savings of up to over 50% possible.

4 Claims, 3 Drawing Sheets

Figure 1:
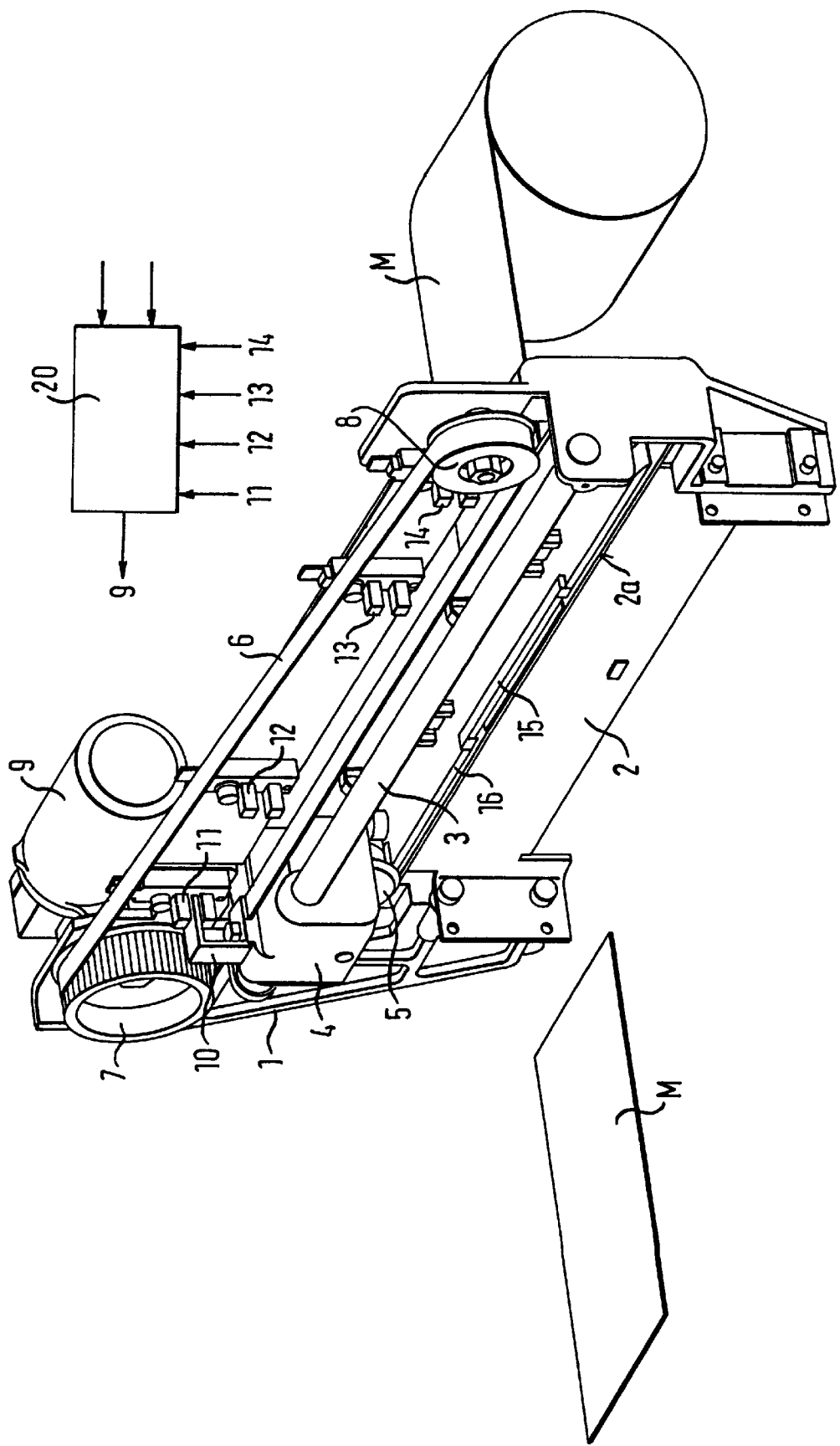

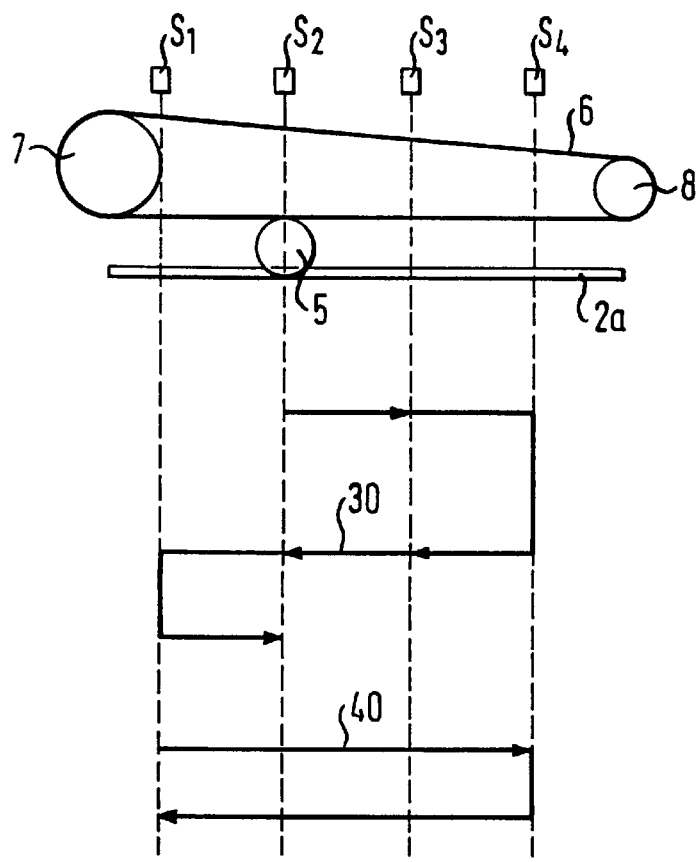
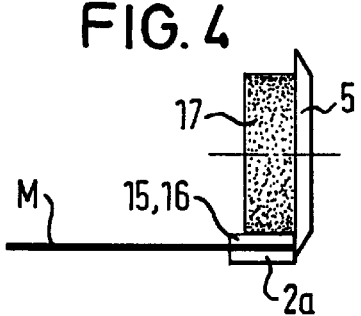
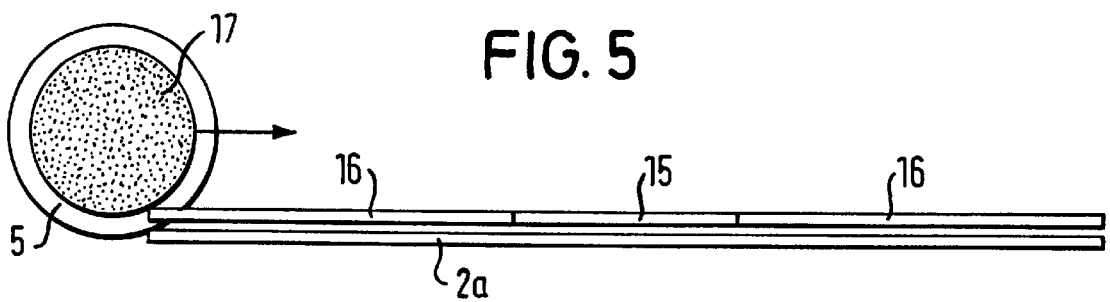

CUTTING ARRANGEMENT FOR A MATERIAL WEB

FIELD OF THE INVENTION

The invention relates to a cutting arrangement for a material web. In particular, the invention relates to a cutting arrangement for photographic copy material in a photographic copier apparatus.

BACKGROUND OF THE INVENTION

In photographic copiers, especially so-called mini labs, cutting arrangements including a knife roller and a drive for reciprocating the knife roller transverse to the material web are often used especially for larger paper widths, since they have various advantages compared to other cutting arrangements. However, if copy paper webs of different widths are processed in the copier apparatus, the cutting time for more narrow paper webs is the same as for the widest paper web for which the cutting arrangement or the copier apparatus is constructed. This is perceived disadvantageous in time sensitive applications.

SUMMARY OF THE INVENTION

A cutting arrangement of the art is now to be improved with the present invention such that it provides shorter cutting times for more narrow material webs than for wider material webs.

The solution of the problem underlying the invention results from the features of the cutting arrangement in accordance with the invention whereby at least two starting positions are provided for each of the two cutting directions and coordinated with different widths of the material web and the cutting movement of the knife roller is started respectively, the starting position associated with the respective material web width and for one cutting direction.

Further, advantageous and especially practical embodiments of the cutting arrangement in accordance with the invention are described below.

DETAILED DESCRIPTION OF THE DRAWINGS

Figure 2:
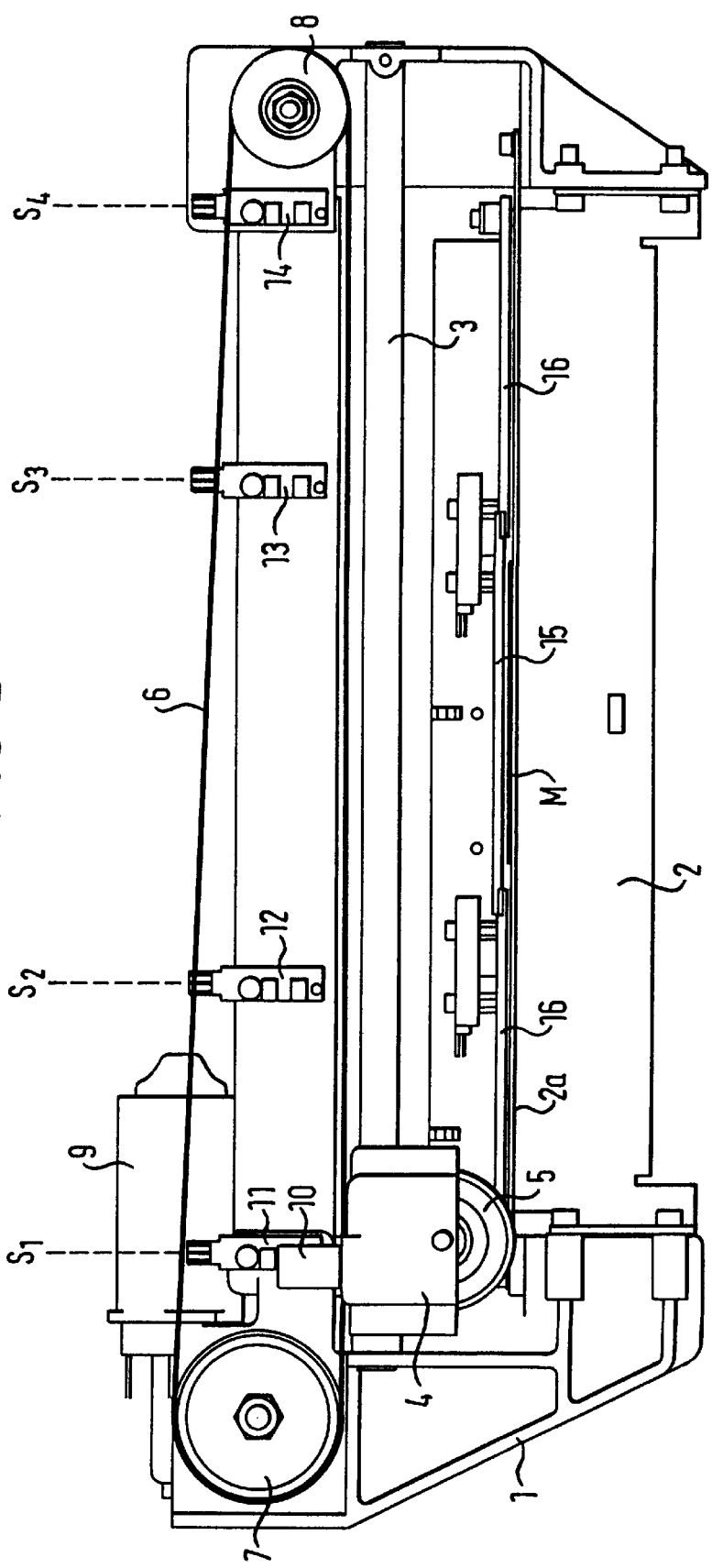

The invention will be further described in the following with reference to the drawing. It show:

FIG. 1 a complete view of a typical embodiment of the cutting arrangement in accordance with the invention in/perspective illustration;

FIG. 2 a front elevation of the cutting arrangement of FIG. 1;

FIG. 3 a sketch explaining the function of the cutting arrangement; and

FIGS. 4 and 5 two schematic detailed views for illustration of the function.

DESCRIPTION OF THE PREFERRED EMBODIMENTS

The illustrated cutting arrangement includes a frame 1 to which all components are mounted. The frame and, therefore, the whole cutting arrangement is in practical use installed transverse to the path of a material web to be cut. A stationary beam 2 is provided in the lower region of the frame on which upper edge a knife bar 2a is positioned. Furthermore, a slide track 3 is mounted in the frame 1 on which a knife sled 4 is moveably supported. A knife roller 5 is rotatably mounted in the knife sled 4, which roller cooperates with the stationary knife bar 2a. The knife sled 4 is affixed to a toothed belt 6 which is guided around two rollers 7 and 8. The roller 7 shown on the left side in the drawings is driven by a drive motor 9 mounted to the frame 1. The knife roller 5 is thereby reciprocatable along the knife bar 2a by way of the motor. The illustrated cutting arrangement so far essentially corresponds to arrangements in the art.

Four photo detectors 11, 12, 13 and 14 are positioned on the frame 1 along the path of the knife sled 4, which photo detectors cooperate with a flag 10 positioned on the knife sled 4. The four photo detectors 11–14 cooperate with an electronic control symbolically illustrated by the box 20, which controls the drive motor 9 and, thereby, the movement of the knife roller 5 along the knife bar 2a. The four photo detectors define four start positions $S_1$–$S_4$ (FIG. 3) for the knife roller 5, whereby the two outer start positions $S_1$ and $S_4$ are at the same time also the turnaround or turn back positions for the reciprocating movement of the knife roller 5. The controller 20 receives from a superior control (not illustrated) the information with respect to the width of the material web to be cut as well as a start signal for the triggering of the cutting process. Of course, the controller 20 and the superior control can also be combined into one control arrangement which, when used in a photographic copier, can also be implemented by the control included therein for the other components thereof.

According to the underlying principle of the invention, the cutting arrangement is provided with different start positions for the knife roller for the cutting of material webs of different width. In the illustrated embodiment, only two material web widths are differentiated, typically about $\leq 4"$ and $> $ than 4". For more narrow material webs ($\leq 4"$) the two inner start positions $S_2$ and $S_3$ are relevant, for wider material webs (>4") the two outer start positions $S_1$ and $S_4$ apply, which, at the same time, define the turnaround or retracing points of the movement. The start positions are furthermore respectively assigned to one cutting direction (direction of movement of the knife roller 5). For the cutting direction from left to right in the drawing, the start positions $S_1$ and $S_2$ apply for wider or more narrow material webs respectively, for the reverse cutting direction from right to left, the starting positions $S_4$ and $S_3$ apply for wider or smaller material webs.

The functioning of the cutting arrangement and the sequence of the movements of the knife roller are best apparent from FIG. 3.

It is assumed that initially a more narrow material web ($\leq 4"$) is to be cut. The knife sled 4 and, thereby, the knife roller 5 therefore are located at starting position $S_2$. As soon as the length of the material web M to be cut is advanced across the knife bar 2, the cutting cycle is initiated by a superior control (not illustrated). The knife roller 5 is thereby moved to the right initially to the starting position $S_3$, whereby the material web is cut, and from there further to the turnaround or turn back position $S_4$ and, finally, back to the starting position $S_3$, where it remains until the next cutting cycle. In the next cutting cycle, the knife roller 5 starting from the starting position $S_3$ is initially moved to the starting position $S_2$ and from there further to the turn back position $S_1$ and, finally, back to the starting position $S_2$, where it remains until the start of the next cutting cycle. The sequence of movement for these two cutting cycles is illustrated in FIG. 3 by line 30.

Of course, it is also possible with more narrow material webs to reciprocate the knife roller 5 only between the two inner starting positions $S_2$ and $S_3$. The further movement after the cutting to the respectively closest turnaround or retracing position and back to the inner starting position, however, provides the advantage that the knife bar is not unevenly worn.

With wider material webs (>4"), the knife roller is moved back and forth in conventional manner between the two turn back positions $S_1$ and $S_4$ as starting positions. The sequence of movements for these two cutting cycles is illustrated in FIG. 3 by line 40.

It is required for a clean cut that the material web M is pressed against the knife bar 2a during the cutting process. According to the invention, two hold-down members 15 and 16 are provided therefor which are operated by the knife roller 5 (FIGS. 4 and 5). The first, inner hold-down member 15 is essentially positioned between the two inner starting positions $S_2$ and $S_3$, the second, outer hold-down member 16 is located in the two regions between respectively an inner starting position $S_2$ or $S_3$ and the respectively closest turnaround or retracing position $S_1$ or $S_4$, i.e., to both sides of the inner hold-down member 15. The two hold-down members 15 and 16 consist essentially of rods parallel to the knife bar 2a, which, in the at rest position, are held by springs (not illustrated) at a small distance above the knife bar 2a. The material web M to be cut is guided between the knife bar 2a and the two hold-down members 15 and 16.

The knife roller 5 is provided with a coaxial rubber roller 17, having a smaller diameter than the knife roller 5, for actuating the two hold-down members 15 and 16. In the two turnaround or turn back positions $S_1$ and $S_4$, the rubber roller 17 is not in engagement with the outer hold-down member 16 (and, of course, not with the inner hold-down member 15), the two hold-down members 15 and 16 therefore are in their at rest position spaced apart from the knife bar 2a, so that a material web advance is possible over the total available width of the cutting arrangement. As soon as the knife roller 5 is moved inward, the rubber roller 17 engages with the outer hold-down member 16, and pushes the latter downward towards the knife bar 2a, whereby the material web M is clamped in place. When the knife roller 5 is moved inward beyond the two inner start positions $S_2$ or $S_3$, the inner hold-down member 15 is analogously pressed downward and vice versa. When the knife roller 5 is at one of the two inner starting positions $S_2$ and $S_3$, the rubber roller 17 is not in engagement with the inner hold-down member 15 so that a more narrow material web can be inserted or advanced.

Time savings of up to 50% are possible with the arrangement in accordance with the invention providing starting positions for material webs of different width.

What is claimed is:

1. Cutting arrangement for a material web comprising:

a knife roller for cutting the material web;

a drive motor and controller for moving the knife roller between at least two outer starting positions coinciding with at least two turn back positions transverse to a material web for performing one cut, the drive motor starting the cutting movement of the knife roller in one cutting direction at a first starting position associated with a material web width, the first starting position being one of the at least two outer starting positions or one of at least two inner starting positions located between the at least two outer starting positions, and moving the knife roller after completion of the cut to the turn back position proximal to said knife roller, and back to a second starting position associated with the other cutting direction for the material web width provided that the second starting position does not coincide with one of said turn back positions;

an inner hold-down member operable by the knife roller to clamp down the material web and positioned between the at least two inner starting positions; and an outer hold-down member operable by the knife roller to clamp down the material web and positioned in the regions between the inner starting positions and the outer starting positions.

2. Arrangement according to claim 1, further comprising:

a stationary knife bar for cooperating with the knife roller, the knife bar extending between the at least two turn back positions of the knife roller.

3. Arrangement according to claim 1, wherein said material web is photographic copy material used in a photographic copier.

4. Arrangement according to claim 1, wherein the distance between the at least two inner starting positions is approximately 4 inches.

* * * * *